(12) United States Patent
Durando et al.

(10) Patent No.: US 8,534,243 B2
(45) Date of Patent: Sep. 17, 2013

(54) INTERNAL COMBUSTION ENGINE WITH MASKING WALL THE CURTAIN AREA OF THE INTAKE VALVES

(75) Inventors: Mario Durando, Orbassano (IT);
Roberto Saretto, Orbassano (IT);
Francesco Perna, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 72 days.

(21) Appl. No.: 13/303,920

(22) Filed: Nov. 23, 2011

(65) Prior Publication Data
US 2012/0160198 A1 Jun. 28, 2012

(30) Foreign Application Priority Data
Dec. 23, 2010 (EP) .................................... 10196728

(51) Int. Cl.
*F01L 1/34* (2006.01)
(52) U.S. Cl.
USPC .......................... 123/90.16; 123/308; 123/432
(58) Field of Classification Search
USPC ...................................... 123/90.16, 308, 432
See application file for complete search history.

(56) References Cited

U.S. PATENT DOCUMENTS

| | | | | |
|---|---|---|---|---|
| 4,957,081 A | * | 9/1990 | Ito et al. .......................... | 123/302 |
| 5,065,712 A | * | 11/1991 | Hundleby .................. | 123/188.14 |
| 5,839,400 A | * | 11/1998 | Vattaneo et al. ............ | 123/90.16 |
| 6,109,234 A | * | 8/2000 | Vallance et al. ............... | 123/308 |

FOREIGN PATENT DOCUMENTS

| | | |
|---|---|---|
| DE | 3928579 A1 | 3/1990 |
| EP | 0431866 A1 | 6/1991 |
| EP | 0803642 A1 | 10/1997 |
| EP | 1344900 A2 | 9/2003 |
| EP | 1555398 A1 | 7/2005 |
| EP | 1653057 A1 | 5/2006 |
| GB | 2342689 A | 4/2000 |
| JP | 10252477 A | 9/1998 |
| JP | 2004293483 A | 10/2004 |
| JP | 2007239604 A | 9/2007 |
| JP | 2010261314 A | 11/2010 |

OTHER PUBLICATIONS

European Search Report for corresponding EP application No. 10196728.9 mailed Jul. 6, 2011.

* cited by examiner

*Primary Examiner* — Ching Chang
(74) *Attorney, Agent, or Firm* — Heslin Rothenberg Farley & Mesiti P.C.; Victor A. Cardona, Esq.

(57) ABSTRACT

A spark ignition four stroke internal combustion engine includes two intake valves and two exhaust valves for each cylinder, arranged around a central spark plug and provided with means for varying the lift of the intake valves between a zero value and a maximum value H. A masking wall which masks the curtain area of the intake valves on one side facing towards the exhaust valves is provided in the combustion chamber associated to each cylinder. The axis of each intake valve is inclined with respect to the axis of the respective engine cylinder by an angle not exceeding 12° and the above-mentioned masking wall has along the seat of each intake valve a height h in the direction parallel to the axis of the intake valve which is comprised between 0.1 and 0.5 times, extremes excluded, the maximum value H of the lift of the intake valves.

3 Claims, 10 Drawing Sheets

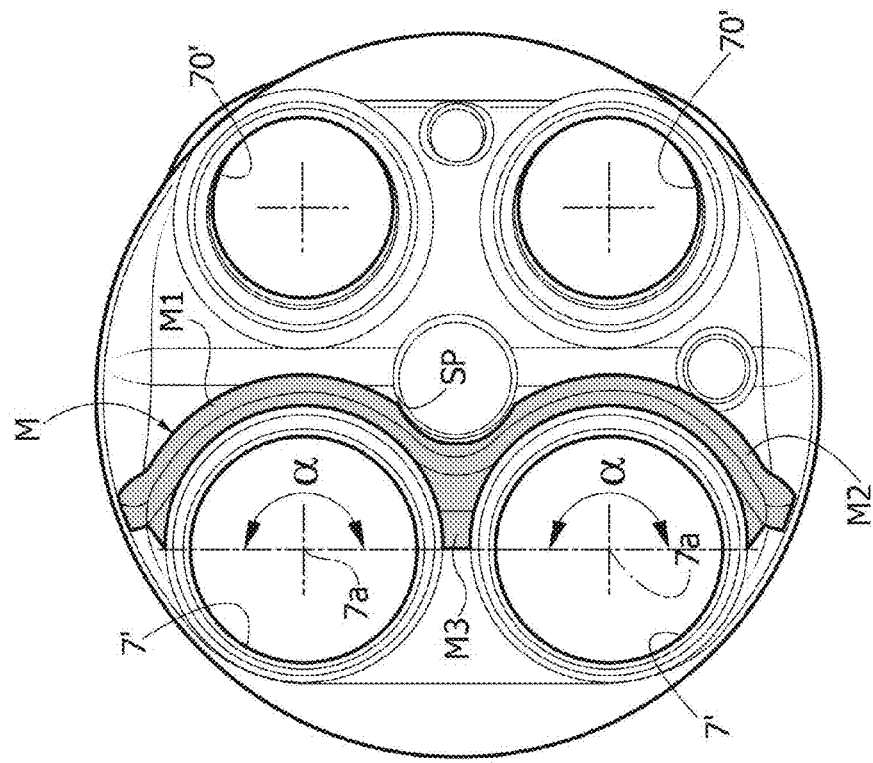
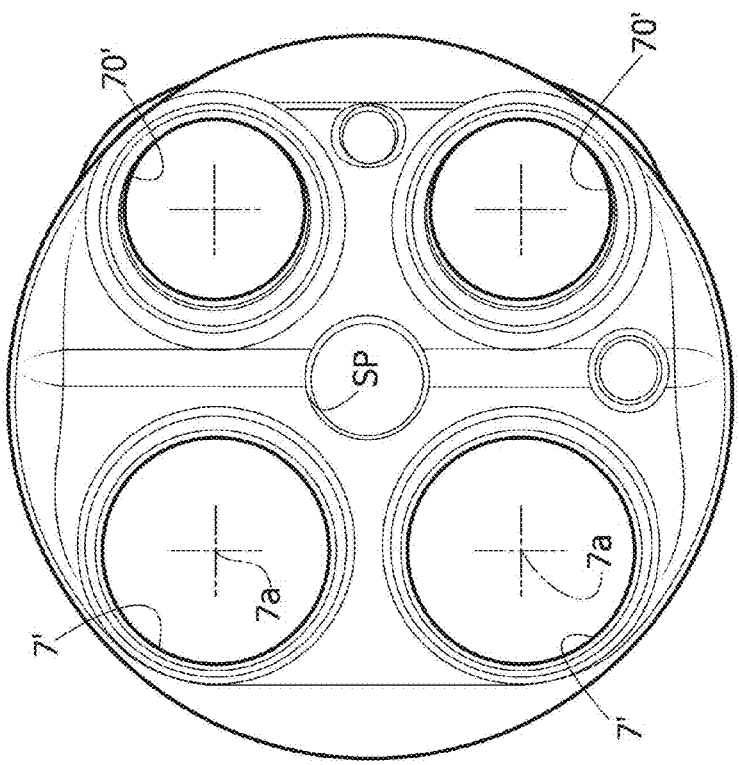

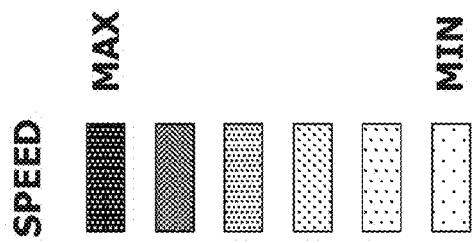
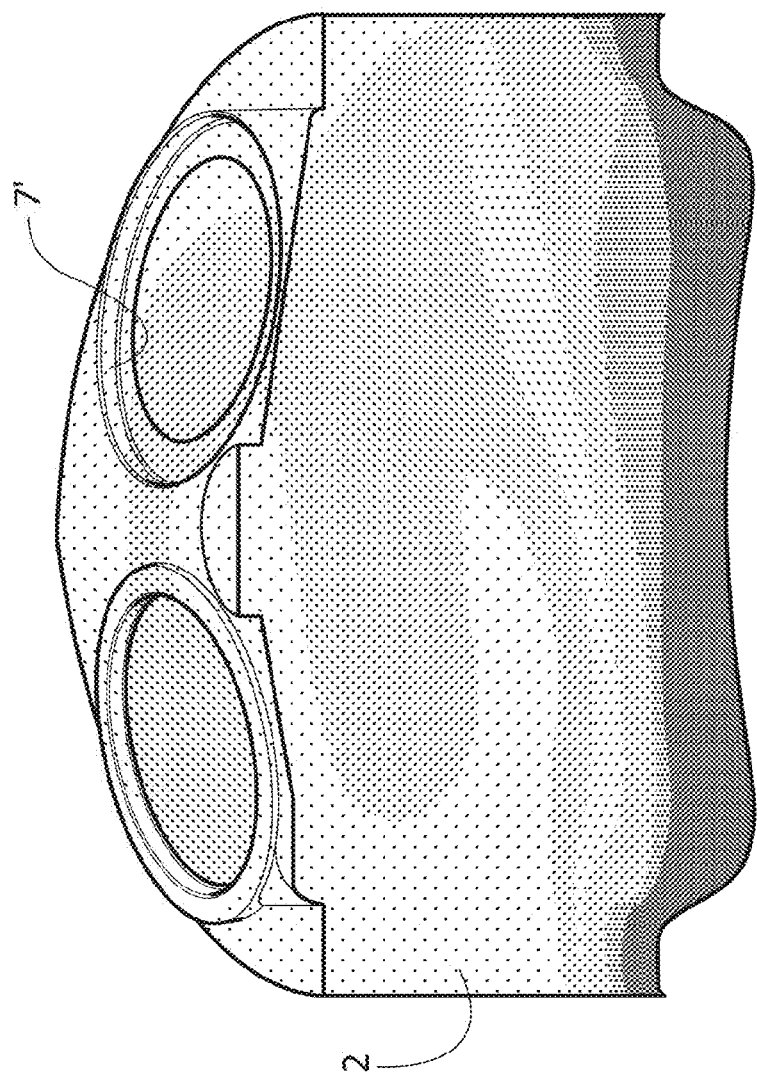
FIG. 11

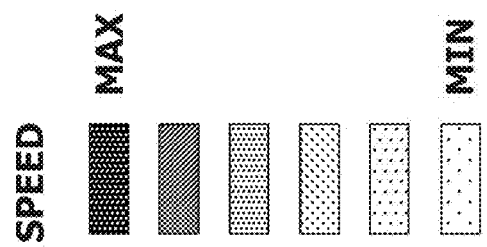
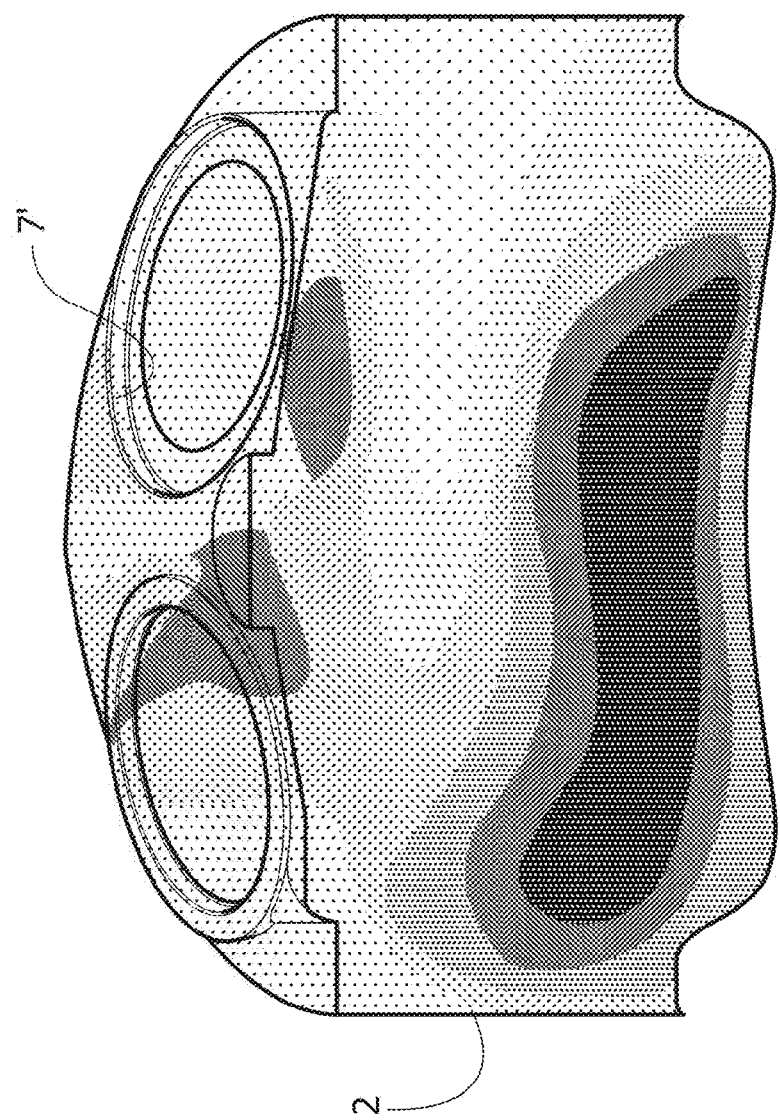
FIG. 12

INTERNAL COMBUSTION ENGINE WITH MASKING WALL THE CURTAIN AREA OF THE INTAKE VALVES

CROSS REFERENCE TO RELATED APPLICATIONS

This application claims priority from European patent application No. EP 10196728.9, filed on Dec. 23, 2010, the entire disclosure of which is incorporated herein by reference.

FIELD OF THE INVENTION

The present invention refers to spark ignition four-stroke internal combustion engines, of the type comprising, for each cylinder:

a combustion chamber, two intake conduits and two exhaust conduits ending up in said combustion chamber, two intake valves and two exhaust valves associated to said intake and exhaust conduits, arranged around a central spark plug, said valves being of the type comprising a stem mounted slidably along the axis thereof and a head in form of a circular disc cooperating with a respective valve seat, means for varying the lift of the intake valves, and a masking wall in said combustion chamber, which masks the curtain area of said intake valves on one side facing towards the exhaust valves.

In the present description, and in the claims that follow, the term "curtain area" is intended to indicate the theoretical cylindrical surface, coaxial with the valve, which, in the open condition of the valve, extends between the circular edge of the head of the valve and the circular edge of the valve seat.

An internal combustion engine having the characteristics indicated above is described in document JP-A-10252477.

OBJECT AND SUMMARY OF THE INVENTION

The object of the present invention is to provide an engine of the previously described type which provides a highly efficient combustion in all the operating conditions thereof and capable of obtaining such objects through simple and reliable means.

With the aim of attaining such object, the invention aims at providing an internal combustion engine having the characteristics indicated at the beginning of the present description and further characterized in that:

the means for varying the lift of the intake valves are capable of actuating any lift value between a zero lift and a maximum lift H, as well as varying both the duration of the opening and the opening and closing instants of each intake valve, the axis of each intake valve is inclined with respect to the axis of the respective engine cylinder by an angle not exceeding 12°, said masking wall has along the seat of each intake valve a height h in the direction parallel to the axis of the intake valve which is comprised between 0.1 and 0.5 times, extremes included, the abovementioned maximum value H of the intake valve lift.

In the preferred embodiment of the invention, the abovementioned means for varying the lift of the intake valves are constituted by the system developed by the Applicant and sold under the trademark "MULTIAIR". In such system, each intake valve is actuated variably, being controlled by a camshaft through a respective tappet, against the action of elastic return means and by interposing hydraulic means including a pressurised fluid chamber which is faced by a pumping piston connected to the tappet of the valve. The pressurised fluid chamber can be placed in communication, through a solenoid valve, with an exhaust channel, with the aim of decoupling the variable actuation valve from the respective tappet and cause the quick closure of the valve due to the respective elastic return means. Electronically controlled means for controlling the abovementioned solenoid valve so as to vary the duration, the lift and the opening and closing instants of the intake valves as a function of one or more operating parameters of the engine, are also provided for in the abovementioned system developed by the Applicant. The same Applicant owns various patents and patent applications regarding engines provided with such system.

However, the invention does not exclude the use of systems for the variable actuation of the intake valves even different from the "MULTIAIR" system of the Applicant, as long as such systems allow actuating any lift value of each intake valve between a zero lift and a maximum lift, as well as varying both the duration of the opening and the opening and closing instants of each intake valve. Actually, such characteristic constitutes an essential characteristic of the present invention and distinguishes the solution addressed herein by the prior art illustrated in the previously identified document, wherein a device that allows solely selecting the lift of the intake valves between a first smaller value and a second greater value is provided for.

As indicated previously, a further essential characteristic of the invention lies in the fact that the axis of each intake valve is inclined with respect to the axis of the respective engine cylinder by an angle not exceeding 12°. Such characteristic is selected due to the greater compactness of the engine, but it introduces the potential drawback of reducing the tumble of the airflow introduced into the combustion chamber during the intake phase, in that the end part of the intake conduit is less inclined with respect to the axis of the cylinder. Furthermore, the adoption of a variable actuation system of the intake valves which is capable of continuously varying the lift of the intake valves between a zero value and a maximum value guarantees the possibility of an optimal performance of the engine at any operating condition, but—on the other hand—it makes the problem related to an insufficient tumble effect at low or extremely low lift values of the intake valve more critical. The abovementioned masking wall is provided with the aim of guaranteeing a sufficient tumble effect even at low engine speeds, when the intake valve lift is lower and the air flow energy entering into the combustion chamber is lower. Studies and experiments carried out by the Applicant revealed the possibility of efficiently overcoming the abovementioned drawback through a masking wall having a height h in the direction parallel to the axis of the intake valve comprised between 0.1 and 0.5 times, extremes excluded, the abovementioned maximum value H of the intake valve lift. Furthermore, in a concrete embodiment, a value substantially equivalent to 0.25 was identified as the ideal value of the h/H ratio.

According to a further preferred characteristic of the invention, along each intake valve seat the abovementioned masking wall has a tapered configuration towards a top edge, with an inner surface, facing towards the axis of the valve, in form of cylindrical surface with axis coinciding with said valve axis, and an outer surface having a radiused profile, with a concave section at the base of the wall and a convex section at the top of the wall. Also in this case, studies and experiments carried out by the Applicant revealed that the above-mentioned profile allows avoiding hot spots within the combustion chamber which could lead to pre-ignition and thermomechanical stress problems.

Still another preferred characteristic of the invention lies in the fact that the inner surface of the abovementioned masking wall, facing towards the axis of each intake valve, has a radial clearance g with respect to the head of the intake valve comprised between 0.005 times and 0.05 times the diameter of the head of the intake valve. In the abovementioned concrete embodiment, the ideal value of such clearance was equivalent to 0.028 times the diameter of the head of the intake valve.

According to a further preferred characteristic, along each intake valve seat the abovementioned masking wall extends around the axis of the intake valve over an angle ☐ comprised between 90° and 200°, extremes excluded, such angle preferably being substantially equivalent to 180°.

As indicated previously, studies and experiments carried out revealed that the characteristics indicated above allow—on one hand—controlling the operation of the engine so as to maintain efficiency thereof maximum and in particular reduce fuel consumption to the minimum and—on the other hand—providing an engine having extremely compact dimensions and which, regardless of the low inclination arrangement of the intake valves, it guarantees a high tumble effect under any operating condition.

BRIEF DESCRIPTION OF THE DRAWINGS

Further characteristics and advantages of the invention shall be clear from the description that follows with reference to the attached drawings, provided purely by way of non-limiting example, wherein:

FIGS. 3, 4 are bottom views of the upper surface of the combustion chamber of an engine cylinder, respectively in an engine identical to that of the invention but without the masking wall and in an engine according to the invention, FIGS. 11, 12 are further schematic representations of the combustion chamber showing the tumble effect respectively in the engine without masking wall and in the engine according to the invention.

DETAILED DESCRIPTION OF THE INVENTION

Over the years, the Applicant has developed multicylinder internal combustion engines, of the type comprising:
at least one intake valve and at least one exhaust valve for each cylinder, each provided with respective elastic return means which push the valve towards a closed position, for controlling respective intake and exhaust conduits,
at least one camshaft, for actuating the intake valves and the exhaust valves of the engine cylinders, by means of respective tappets,
wherein at least each intake valve is of the variable actuation type, being controlled by the respective tappet, against the action of the abovementioned elastic return means, by interposing hydraulic means including a pressurised fluid chamber, which is faced by a pumping piston connected to the tappet of the valve,
said pressurised fluid chamber being adapted to be connected by means of a solenoid valve with an exhaust channel, with the aim of decoupling the variable actuation valve from the respective tappet and cause the quick closure of the valve due to the respective elastic return means, and
electronically controlled means per controlling each solenoid valve so as to vary the time and the opening stroke of the variable actuation valves as a function of one or more operating parameters of the engine.

The Applicant owns various patents and patent applications regarding engines provided with a system of the previously described type, sold under the "MULTIAIR" trademark. For the sake of immediate reference, FIG. 1 of the attached drawings shows a cross-sectional view of an engine according to such technique, as described in the European patent EP 0 803 642 B1 of the Applicant.

Figure 1:
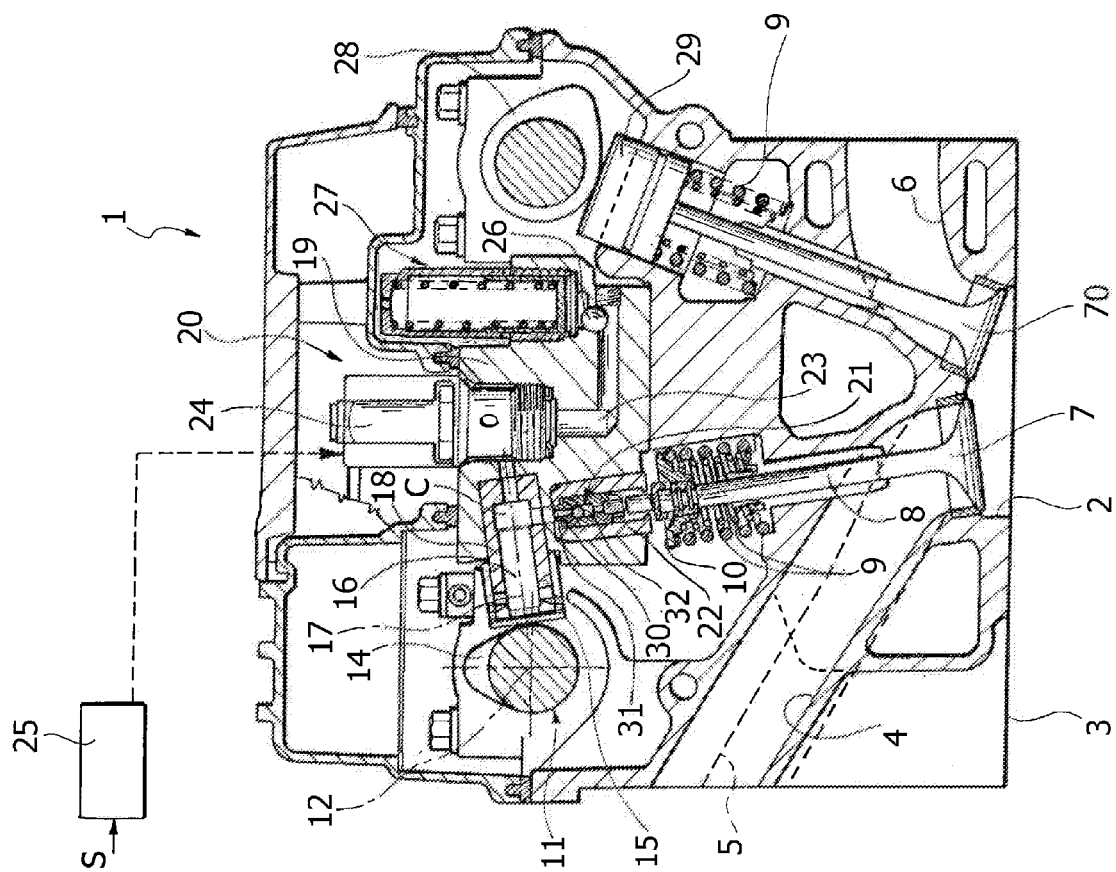
FIG. 1 is a cross-sectional schematic view of an engine provided with a "MULTIAIR" system according to the description of document EP 0 803 642 B1 of the Applicant.

With reference to such FIG. 1, the engine illustrated therein is a multicylinder engine, for example an in-line four-cylinder internal combustion engine, comprising a cylinder head 1.

The head 1 comprises, for each cylinder, a cavity 2 formed by the base surface 3 of the head 1, defining the combustion chamber, in which two intake conduits 4, 5 and two exhaust conduits 6 end up. The communication of the two intake conduits 4, 5 with the combustion chamber 2 is controlled by two intake valves 7, of the conventional mushroom-like intake valves, each comprising a stem 8 mounted slidably in the body of the head 1.

Each valve 7 is returned towards the closed position by springs 9 interposed between an inner surface of the head 1 and an end retaining cap 10 of the valve. The communication of the two exhaust conduits 6 with the combustion chamber is controlled by two valves 70, also of the conventional type, to which springs 9 for returning towards the closed position are associated.

The opening of each intake valve 7 is controlled, in a manner to be described hereinafter, by a camshaft 11 mounted rotatable around an axis 12 within supports of the head 1, and comprising a plurality of cams 14 for the actuation of the intake valves 7.

Each cam 14 which controls an intake valve 7 cooperates with the plate 15 of a tappet 16 mounted slidably along an axis 17 which, in the case of the example illustrated in the previously mentioned prior art document, is directed substantially at 90° with respect to the axis of the valve 7. The plate 15 is returned against the cam 14 by a spring associated thereto. The tappet 16 constitutes a pumping piston mounted slidably within a bushing 18 carried by a body 19 of a preassembled assembly 20, incorporating all the electrical and hydraulic devices associated to the actuation of the intake valves, according to the detailed description outlined hereinafter.

The pumping piston 16 is capable of transmitting a thrust to the stem 8 of the valve 7, so as to cause the opening of the latter against the action of the elastic means 9, by means of pressurised fluid (preferably oil coming the engine lubrication circuit) present in a pressure chamber C towards which the pumping piston 16 faces, and by means of a piston 21 mounted slidably in a cylindrical body constituted by a bushing 22 which is also carried by the body 19 of the sub-assembly 20.

Still in the prior art solution illustrated in FIG. 1, the pressurised fluid chamber C associated to each intake valve 7 can be placed in communication with an exhaust channel 23 through a solenoid valve 24. The solenoid valve 24, which can be of any known type, adapted to the function illustrated herein, is controlled by electronically controlled means, schematically indicated with 25, as a function of the signals S indicating the operating parameters of the engine, such as the position of the accelerator and the number of engine revolutions.

When the solenoid valve 24 is open, the chamber C is placed in communication with the channel 23, hence the pressurized fluid present in the chamber C flows into such channel and leads to the decoupling of the cam 14 and the respective tappet 16 from the intake valve 7, which thus quickly returns to the closed position thereof under the action of the return spring 9. Thus, controlling the communication between the chamber C and the exhaust channel 23 allows varying the opening time and stroke of each intake valve 7 at will.

The exhaust channels 23 of the various solenoid valves 24 all end up the in the same longitudinal channel 26 communicating with pressure accumulators 27, only one of which is visible in FIG. 1.

All the tappets 16 with the associated bushings 18, the pistons 21 with the associated bushings 22, the solenoid valves 24 and the respective channels 23, 26 are carried by and obtained from the abovementioned body 19 of the preassembled unit 20, to the advantage of the quickness and simplicity of assembly of the engine.

The exhaust valves 70 associated to each cylinder are controlled, in the embodiment illustrated in FIG. 1, in a conventional manner, by a respective camshaft 28, through respective tappets 29, though an application of the hydraulic actuation system also to the control of the exhaust valves is not generally excluded in the case of the previously mentioned prior art document.

Still with reference to FIG. 1, the variable volume chamber defined within the bushing 22 and facing the piston 21 (which is illustrated in the minimum volume condition thereof in FIG. 1, the piston 21 being in the upper end stop position thereof) is placed in communication with the pressurised fluid chamber C through an opening 30 obtained in an end wall of the bushing 22. Such opening 30 is engaged by an end nose 31 of the piston 21 so as to provide a hydraulic braking of the movement of the valve 7 during the closing phase, when the valve is close to the closed position, in that the oil present in the variable volume chamber is forced to flow into the pressurised fluid chamber C passing through the clearance present between the end nose 31 and the wall of the opening 30 engaged thereby. Besides the communication constituted by the opening 30, the pressurised fluid chamber C and the variable volume chamber of the piston 21 communicate with each other through internal passages obtained in the body of the piston 21 and controlled by a check-valve 32 which allows the passage of the fluid only from the pressurised chamber C to the variable volume chamber of the piston 21.

During the normal operation of the prior art engine illustrated in FIG. 1, when the solenoid valve 24 excludes the communication of the pressurised fluid chamber C with the exhaust channel 23, the oil present in such chamber transmits the movement of the pumping piston 16, imparted by the cam 14, to the piston 21 which controls the opening of the valve 7. In the initial phase of the movement for opening the valve, the fluid coming from the chamber C reaches the variable volume chamber of the piston 21 passing through the check-valve 32 and further passages which place the internal cavity of the piston 21, which is tubular-shaped, in communication with the variable volume chamber. After a first displacement of the piston 21, the nose 31 exits from the opening 30, hence the fluid coming from the chamber C can directly pass into the variable volume chamber through the opening 30, now open.

In the reverse movement of closing the valve, as previously mentioned, during the final phase the nose 31 enters into the opening 30 causing the hydraulic braking of the valve, so as to avoid impacts of the body of the valve against the seat thereof, for example subsequently to an opening of the solenoid valve 24 which causes the immediate return of the valve 7 to the closed position.

Alternatively to the hydraulic braking device illustrated in FIG. 1, the Applicant also previously proposed (see European patent application EP 1 344 900 A2) a different solution in which the piston 21 for controlling the intake engine valve does not have the end nose and the check-valve 32 is obtained in a fixed part instead of being obtained in the body of the piston 21. Furthermore, one or more passages directly communicating with the pressure chamber C end up in the wall of the bushing within which the piston 21 is mounted slidably. Such passages are configured and positioned so that they are progressively intercepted by the piston 21 in the final phase of closing the engine valve, with the aim of providing a narrowing of the passage section for the fluid, with ensuing hydraulic braking effect. Furthermore, in the solution proposed in the European patent application EP 1 344 900 A2 an auxiliary hydraulic tappet is interposed between the piston 21 for controlling the engine valve and the stem of the engine valve.

Figure 2:
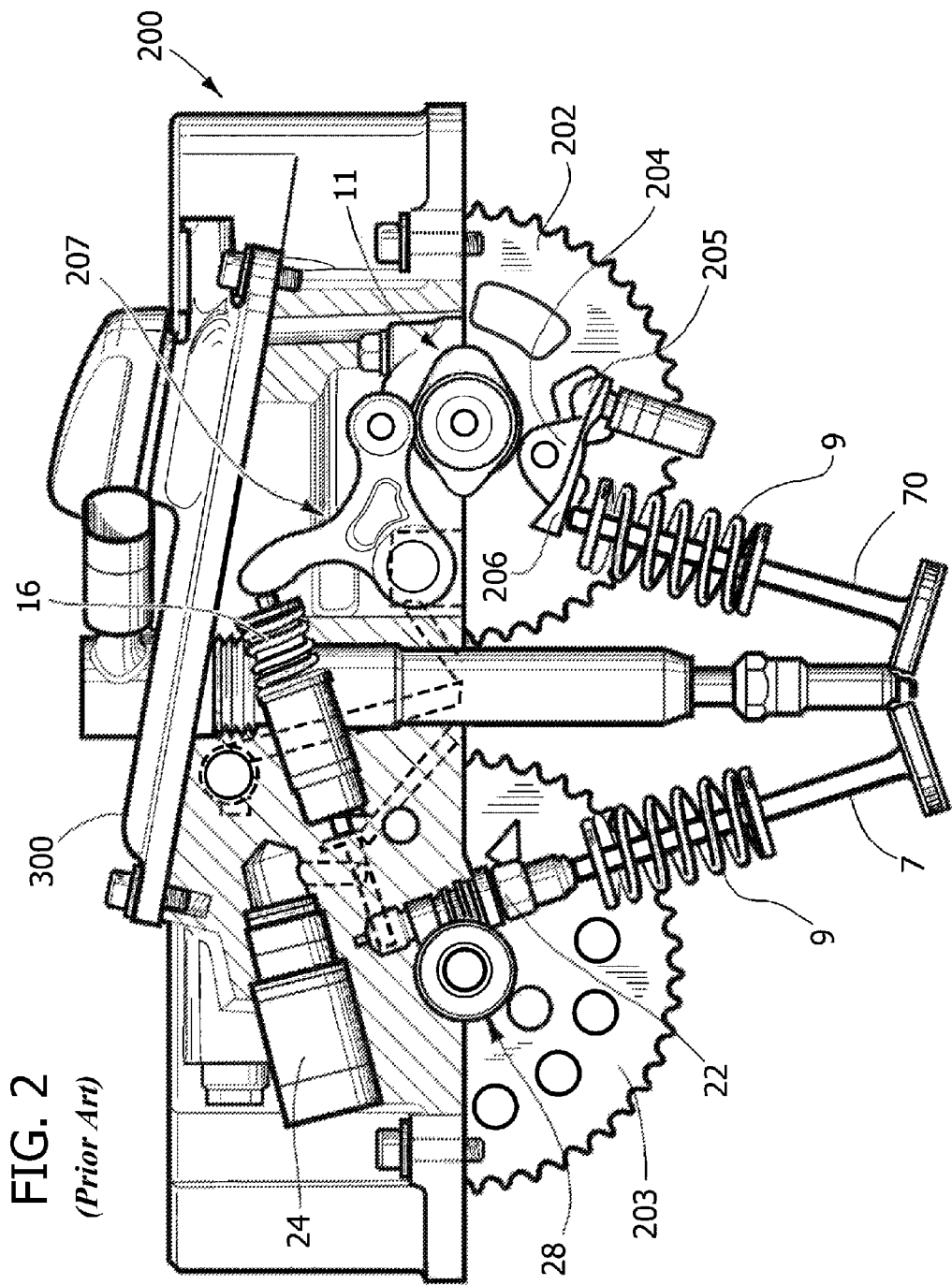
FIG. 2 is a further schematic representation showing a variant of the "MULTIAIR" system, as described in document EP 1 344 900 A2 of the Applicant.

With the aim of illustrating another relevant application previously proposed by the Applicant, FIG. 2 of the attached drawings shows the embodiment subject of the previous European patent application EP 1 653 057 A1 of the Applicant. In this case, the engine is provided with a single camshaft for controlling both the intake valves and the exhaust valves.

With reference to FIG. 2, all components of the electronically controlled hydraulic device are carried by a single brick structure 200 which has a lower plane which in the mounted condition corresponds to the plane passing through the axes of two shafts 11, 28. The shaft 11 is the only camshaft of the engine and it is therefore provided both with cams for controlling the intake valves and the cams for controlling the exhaust valves of the engine, while the shaft 28 is a camless shaft having an end projecting from the cylinder head carrying a power take off which can be used for the actuation of any auxiliary system.

Analogously to the conventional engine, the two shafts 11, 28 have ends also outside the cylinder head carrying gears 202, 203 intended to mesh with the transmission chain which transmits motion from the drive shaft to the shafts 11, 28.

The shaft 11, as mentioned previously, is provided both with cams for actuating the intake valves of the engine and cams for actuating the exhaust valves. According to a solution proposed previously in the prior European patent application n EP 1 555 398 A1 of the Applicant, the cams for controlling the intake valves control the latter by means of an electronically controlled hydraulic device of the type analogous to the one described with reference to FIG. 1. In FIG. 2, the parts of such device are indicated with the same reference numbers that were used in FIG. 1. On the contrary, the exhaust valves are controlled mechanically by the respective cams of the shaft 11. As clearly observable in FIG. 2, the exhaust valves are controlled through rocker arms 204 each of which has an end 205 pivoted to the structure of the cylinder head, an intermediate roller for contact with the respective cam, and the opposite end 206 which controls the respective exhaust valve 70. The pumping element 16 associated to each intake valve is instead controlled by a rocker arm 207 which is pivoted to the brick structure 200 and which has portions for respectively engaging with the control cam carried by the shaft 11 and with the pumping element 16. FIG. 2 also illustrates the spark plug centrally associated to the engine cylinder. As previously mentioned, the brick carries all the elements part of the electronically controlled hydraulic device for the variable actuation of the intake valves 7, as well as all the channels of the hydraulic system associated to such device.

Now, with reference to the engine according to the invention, such engine is a four-stroke spark ignition engine, provided with a system for variably actuating the intake valves for example of the "MULTIAIR" type described previously with reference to FIGS. 1 and 2, capable of obtaining a lift of the intake valves equivalent to any value comprised between the zero value and a maximum value and also capable of varying both the duration of the opening of the intake valves and the opening and closing instants of the intake valves during the engine operating cycle. The use of a "MULTIAIR" system also allows the advantage of being able to provide a plurality of operations for opening and closing the intake valves within the engine intake phase. It should however be observed that the engine according to the invention can also be provided with a system for the variable actuation of the intake valves different from the "MULTIAIR" system, as long as it is capable of obtaining a lift of the intake valves corresponding to any value comprised between the zero value and a maximum value, as well as varying both the opening duration of the intake valves and the opening and closing instants of the intake valves.

According to a further essential characteristic of the engine according to the invention, the axis of each intake valve is inclined with respect to the axis of the respective engine cylinder by an angle not exceeding 12°. Such characteristic can be observed in FIG. 8 of the attached drawings, where the parts common to that of FIGS. 1, 2 are indicated with the same reference number. In such figure, the axis of each of the two intake valves 7 associated to each cylinder is indicated with 7a, while X indicates the axis of the cylinder. In such concrete embodiment, the angle A comprised between the axes 7a and X is substantially equivalent to 10°, and same case applies to the axis of each of the two exhaust valves associated to each cylinder. Such low inclination arrangement of the axes of the valves of the engine allows obtaining an engine having more compact dimensions, especially in the horizontal direction with reference to FIG. 8.

Figure 6:
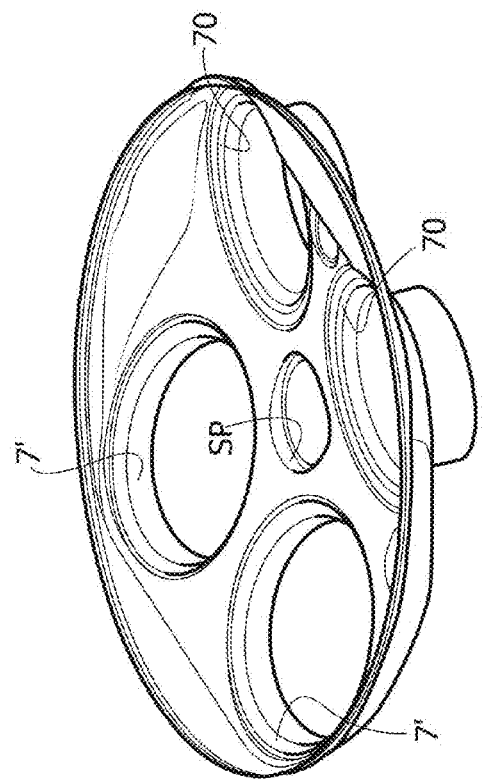

Also with reference to FIGS. 4, 6 of the attached drawings, a further important characteristic of the engine according to the invention lies in the fact that two intake valves and two exhaust valves (FIGS. 4, 6 show the seats 7' and 70' respectively of the intake valves 7 and of the exhaust valves 70) which are arranged around a central spark plug (FIGS. 4, 6 only show the seat SP for the spark plug, which is instead illustrated in FIG. 2, at a vertical central position between the valves 7, 70) are provided for each cylinder.

A further essential characteristic of the engine according to the invention which is clearly observable in FIGS. 4, 6, 8 and 9 of the attached drawings lies in the fact that the upper surface of the combustion chamber associated to each cylinder, defined in the lower surface 3 of the cylinder head, is formed with a masking wall which masks the curtain area of the intake valves 7 on the side facing towards the exhaust valves 70.

As previously mentioned, in the present description and in the claims that follow the term "curtain area" is used to indicate the theoretical cylindrical surface, coaxial with each intake valve, which is defined, when the intake valve is open, between the circular edge of the head of the intake valve and the circular edge of the seat thereof.

With reference to FIGS. 4, 6, 8 and 9, the masking wall provided in each combustion chamber of the engine according to the invention is indicated in its entirety with reference M and it has two arched sections M1, M2, connected to each other by a central portion M3, which is coaxially extended to the axis 7a of each intake valve along the circular edge of the valve seat 7'.

Figure 5:
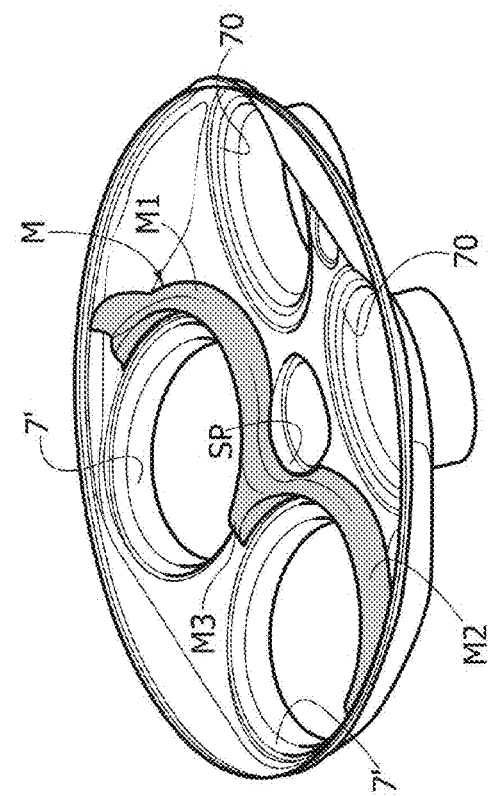
FIGS. 5, 6 are perspective views corresponding to FIGS. 3, 4.

The comparison of FIGS. 4, 6 with FIGS. 3, 5, which refer to an identical engine but without the masking wall, immediately shows the configuration difference of the surface of the combustion chamber.

Figure 8:
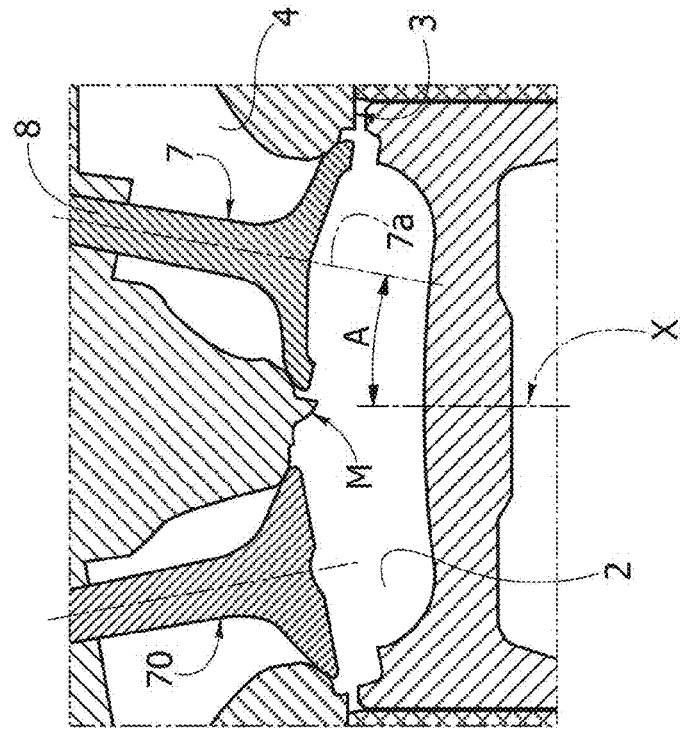
FIG. 8 is a cross-sectional view according to line VIII-VIII of FIG. 7.
Figure 7:
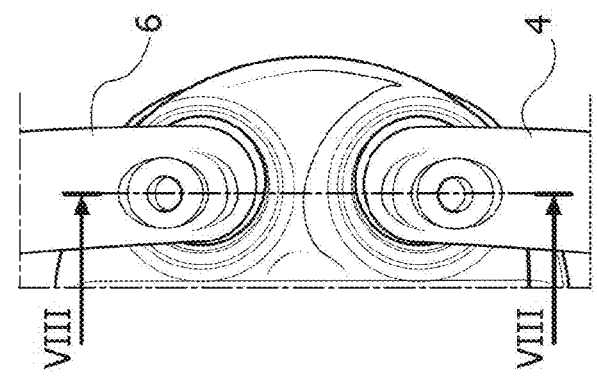
FIG. 7 is a further partial view of a combustion chamber of the engine according to the invention.
Figure 9:
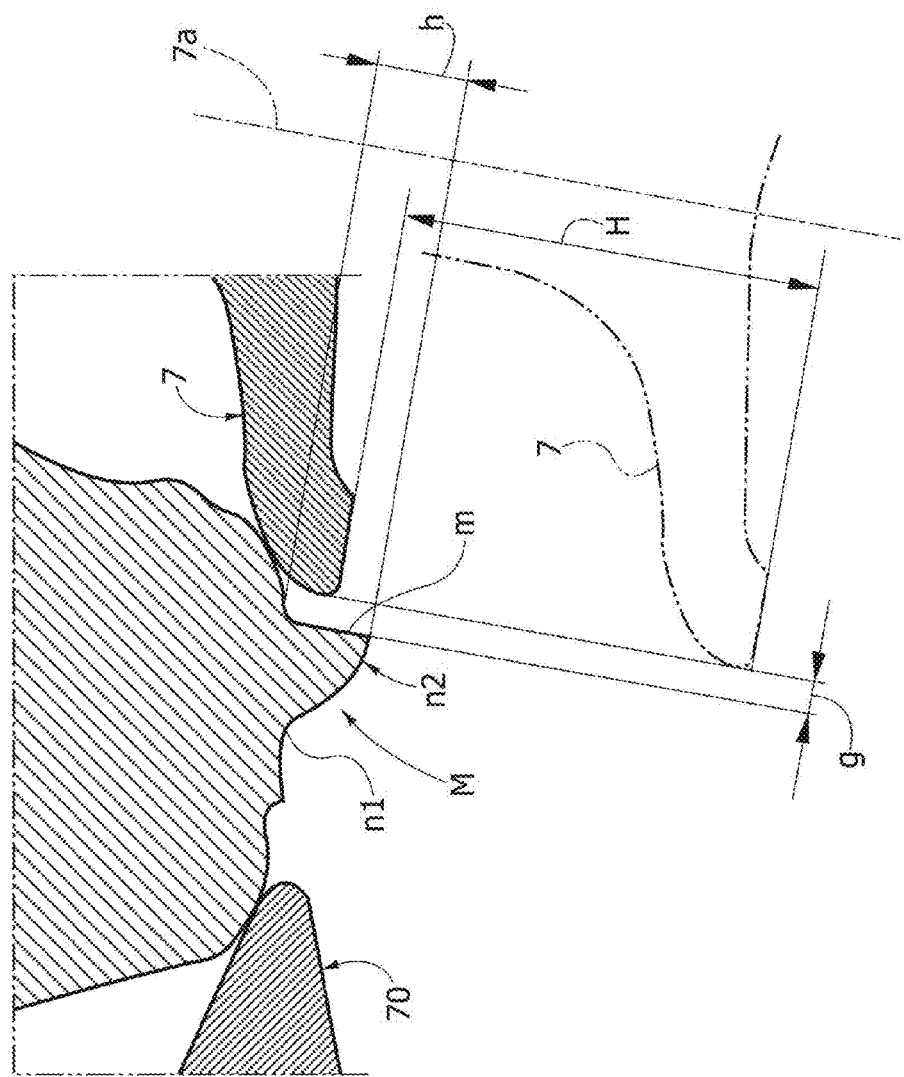
FIG. 9 illustrates a detail of FIG. 8 in enlarged scale.

Still with reference to FIG. 9, which shows the detail of the section of the masking wall M observable in FIG. 8 in enlarged scale, the masking wall M has, in each section M1, M2 along the edge of each valve seat 7', a section tapered towards a top edge, with an inner surface m, facing towards the axis of the intake valve 7, which is a cylindrical surface with axis coinciding with the axis 7a of the valve. Furthermore, each of the portions M1, M2 of the masking wall M has an outer surface having a radiused profile, with a concave section n1 at the base of the wall M and a convex section n2 at the top of the wall. The profile thus defined of the section of the masking wall M was ideal for avoiding hot spots in the combustion chamber that could cause pre-ignition and lead to thermo-mechanical stresses.

Still with reference to FIG. 9, reference h indicates the height, in the direction parallel to the axis 7a of each intake valve, of the masking wall M, while H indicates the maximum lift value of the intake valve (which is illustrated with a dashed line in FIG. 9 in the condition of maximum opening thereof).

Studies and experiments carried out by the Applicant lead to defining an ideal value of the h/H ratio with the aim of providing an ideal tumble effect at any engine operating condition and for any value of the intake valve lift which can be actuated by the variable valve actuation system. The selected value of the h/H ratio is comprised between 0.1 and 0.5 and it is preferably substantially equivalent to 0.25. The radial clearance g (see FIG. 9) between the internal cylindrical wall m of the masking wall M and the circular edge of the head of the intake valves 7 is preferably comprised between 0.005 and 0.05 times the value of the diameter of the circular head of the intake valve. Preferably, the ratio between the clearance g and the diameter of the head of the intake valve is substantially equivalent to 0.028. Furthermore, with reference to FIG. 4, the angular width a along which the respective portion of the masking wall M extends, around the axis 7a of each intake valve, is comprised between 90° and 200° and it is preferably substantially equivalent to 180°.

FIGS. 11, 12 are diagrams showing the speed field of the airflow flowing into the combustion chamber during an intake phase, in a low opening condition of the intake valves, respectively in the case of the engine of FIGS. 3, 5 and in the case of the engine according to the embodiment of the invention illustrated in FIGS. 4, 6.

With reference to FIG. 8, the low inclination A of the axis of the intake valves would lead, in absence of the masking wall M, to an insufficient tumble effect of the airflow flowing into the combustion chamber 2 in the case of low opening of the intake valve 7, at low engine speed. In such conditions, the energy of the inflowing airflow is low. In conventional engines with greater inclination A, the tumble effect is guaranteed in that, with reference to the representation of FIG. 8, the airflow coming from the intake conduit 4 has a high inclination, hence upon reaching in the combustion chamber it tends to follow a circulatory motion (anticlockwise, in the plane of FIG. 8). In the case of the engine according to the invention, the low inclination A however does not give rise to drawbacks in terms of the tumble effect (which is desired to obtain high combustion efficiency) in that the masking wall M diverts the incoming airflow rightwards (with reference to FIG. 8), so as to introduce a circulatory motion opposite to that of a conventional engine with more inclined valves (i.e. in the clockwise direction in FIG. 8).

Figure 10:
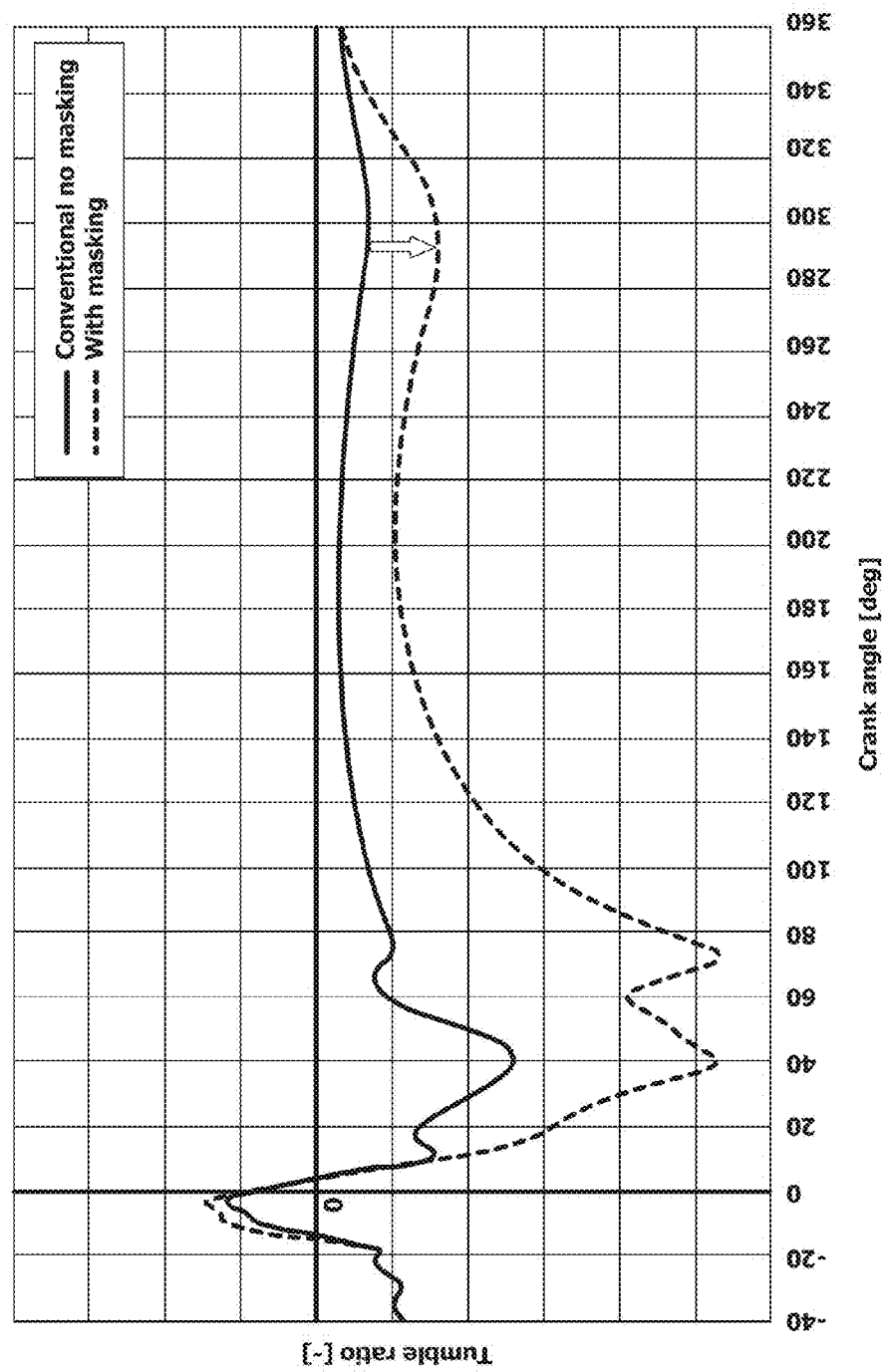
FIG. 10 illustrates a diagram which compares the tumble effect in an engine identical to that of the invention but without the masking wall and in an engine according to the invention.
Figure 13:
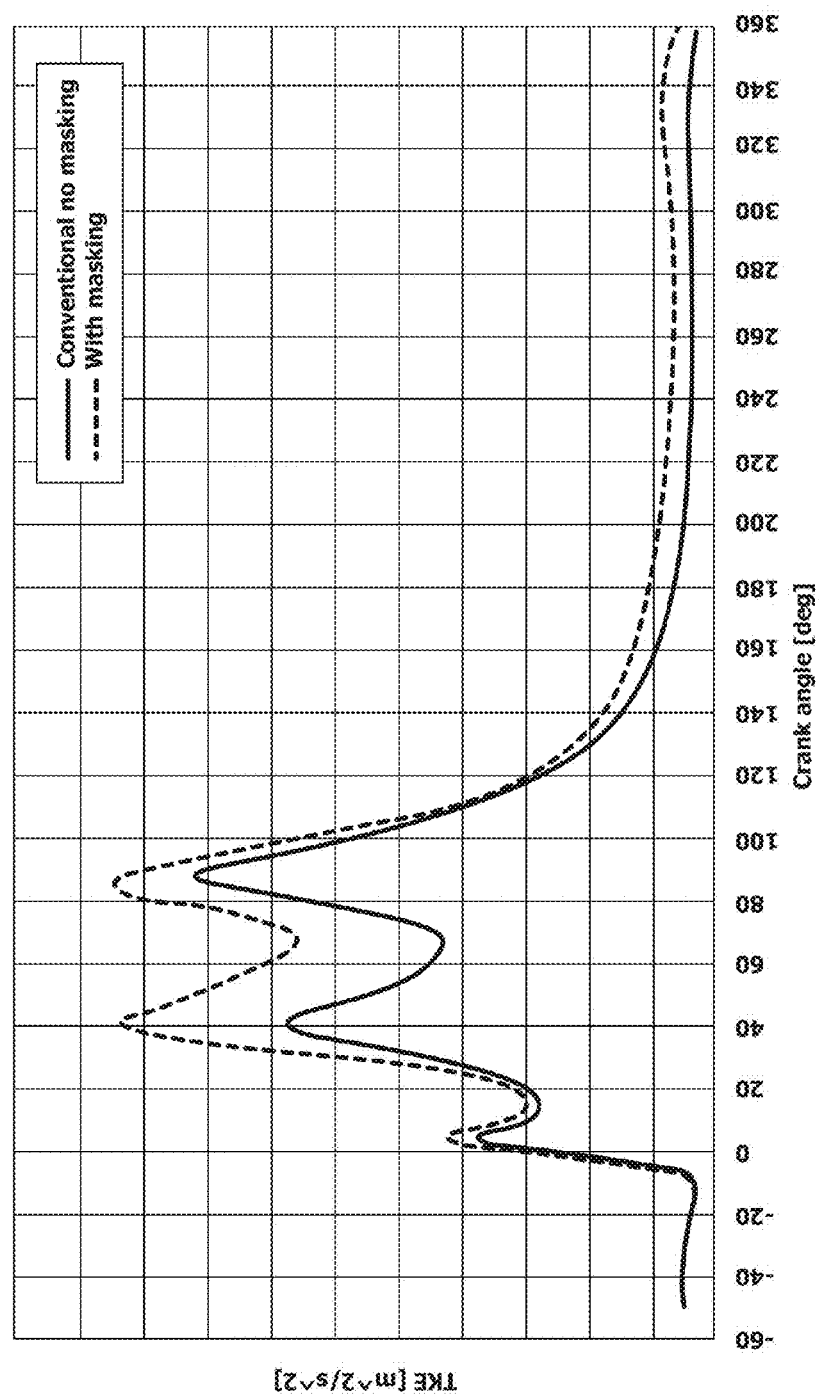
FIG. 13 illustrates a further diagram illustrating the mean turbulent kinetic energy of the air flowing into the combustion chamber respectively in the case of the engine without masking wall and the engine according to the present invention.

The diagram of FIG. 10 shows the value of the so-called tumble ratio (defined as the component, in the direction normal to the centreline plane of the chamber, of the ratio between the equivalent velocity of the fluid vortex and the rotational speed of the engine) at the various engine angles respectively in the case of an engine of the type illustrated in the FIGS. 3, 5, and in the case of an engine according to the invention, with masking wall. As observable, the tumble effect increases considerably. The advantages of the invention are also apparent from the diagram of FIG. 13 which compares the mean turbulent kinetic energy of the tumble flow in the case of the engine of FIGS. 3, 5 and that of the engine according to the invention of FIGS. 4, 6.

At the same time, when the engine is running at a high speed and the variable actuation system of the intake valves enables the complete opening of the valves, up to the maximum value H of the lift of the intake valves, the masking wall should not be a hindrance, given that it is necessary to exploit the high energy of the airflow flowing into the combustion chamber to obtain an ideal combustion.

As indicated previously, the specific configuration of the masking wall of the engine according to the invention is capable of efficiently meeting all the aforementioned needs, all combined with a with a system for variably actuating the valves which allows optimal adaptation of the lift of the intake valves to any engine operating condition, providing a lift value which can be any value comprised between a zero value and the maximum value H.

Obviously, without prejudice to the principle of the invention the construction details and the embodiments may vary widely with respect to what has been described and illustrated purely by way of example, without departing from the scope of protection of the present invention.

What is claimed is:

1. A spark ignition four stroke internal combustion engine, comprising, for each cylinder:
   a combustion chamber,
   two intake conduits and two exhaust conduits ending up in said combustion chamber,
   two intake valves and two exhaust valves associated to said intake and exhaust conduits, arranged around a central spark plug, each of said valves comprising a stem mounted slidably along the axis thereof and a head in form of a circular disc cooperating with a respective valve seat,
   means for varying the lift of the intake valves, and
   a masking wall in said combustion chamber, which masks a curtain area of said intake valves on one side facing towards the exhaust valves,
   wherein:
   the means for varying the lift of the intake valves are actuating a lift value between a zero lift and a maximum lift H, as well as varying both the duration of the opening and the opening and closing instants of each intake valve,
   the axis of each intake valve is inclined with respect to the axis of a respective engine cylinder by an angle not exceeding 12°,
   said masking wall has along the seat of each intake valve a height h in the direction parallel to the axis of the intake valve which is comprised between 0.1 and 0.5 times, extremes included, a maximum value H of the lift of the intake valve;
   wherein said angle of inclination of each intake valve does not exceed 12°;
   wherein along each intake valve seat the masking wall has a tapered configuration towards a top edge, with an inner surface facing towards the axis of each intake valve, in form of cylindrical surface with axis coinciding with said axis of the intake valve, and an outer surface having a radiused profile, with a concave section at the base of the masking wall and a convex section at the top of the masking wall;
   wherein the inner surface of the masking wall facing towards the axis of each intake valve has a radial clearance with respect to the head of the intake valve comprised between 0.005 and 0.05 times the diameter of the head of the intake valve;
   wherein said masking wall has along the seat of each intake valve a height h in the direction parallel to the axis of the intake valve which is substantially equivalent to 0.25 times the maximum value H of the intake valve lift;
   wherein the inner surface of the masking wall facing towards the axis of each intake valve has a radial clearance with respect to the head of the intake valve substantially equivalent to 0.028 times the diameter of the head of the intake valve; and
   wherein along each intake valve seat the masking wall extends around the axis of the intake valve over an angle comprised between 90° and 200°, extremes excluded.

2. The engine according to claim 1, wherein said angle is substantially equivalent to 180°.

3. The engine according to claim 1, wherein means for varying the lift of the intake valves comprise at least one camshaft for actuating the intake valves, each intake valve being controlled by said camshaft through a respective tappet, against the action of elastic return means and by interposing hydraulic means including a pressurised fluid chamber towards which a pumping piston connected to a tappet face of the tappet, said pressurised fluid chamber being adapted to be connected by means of a solenoid valve with an exhaust channel, with the aim of decoupling the intake valve from the respective tappet and causing the quick closure of the valve due to the respective elastic return means, electronically controlled means being provided for controlling said solenoid valve so as to vary the lift, the opening duration and the opening and closing instants of the intake valve as a function of one or more operating parameters of the engine.

* * * * *